(12) United States Patent
Imai et al.

(10) Patent No.: US 11,956,525 B2
(45) Date of Patent: Apr. 9, 2024

(54) CONTROL DEVICE AND PHOTOGRAPHING SYSTEM

(71) Applicant: ISUZU MOTORS LIMITED, Tokyo (JP)

(72) Inventors: Akira Imai, Fujisawa (JP); Ryuta Tsuda, Fujisawa (JP); Hideto Hirahara, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 313 days.

(21) Appl. No.: 17/433,153

(22) PCT Filed: Feb. 13, 2020

(86) PCT No.: PCT/JP2020/005440
§ 371 (c)(1),
(2) Date: Aug. 23, 2021

(87) PCT Pub. No.: WO2020/175144
PCT Pub. Date: Sep. 3, 2020

(65) Prior Publication Data
US 2022/0182518 A1    Jun. 9, 2022

(30) Foreign Application Priority Data
Feb. 25, 2019  (JP) .................. 2019-031708

(51) Int. Cl.
*H04N 23/56* (2023.01)
*G03B 15/02* (2021.01)
*H04N 23/611* (2023.01)

(52) U.S. Cl.
CPC ............. *H04N 23/56* (2023.01); *G03B 15/02* (2013.01); *H04N 23/611* (2023.01)

(58) Field of Classification Search
CPC ...... H04N 23/56; H04N 23/611; H04N 23/74; G03B 15/02; G08G 1/167
See application file for complete search history.

(56) References Cited

U.S. PATENT DOCUMENTS 5,699,057 A    12/1997  Ikeda et al.
8,120,664 B2*  2/2012  Nozaki ............... H04N 23/673
                                                    348/222.1
(Continued)

FOREIGN PATENT DOCUMENTS

CN    108845327 A    11/2018
EP      1674885 A1   12/2004
(Continued)

OTHER PUBLICATIONS

International Search Report dated Apr. 14, 2020, for International Application No. PCT/JP2020/005440, 5 pages.
(Continued)

*Primary Examiner* — Ahmed A Berhan
(74) *Attorney, Agent, or Firm* — Procopio, Cory, Hargreaves & Savitch LLP

(57) ABSTRACT

The present invention includes: a preliminary photography unit 521 that performs preliminary photography which is photography at a stage before the main photography for photographing the driving state of a driver of a vehicle using a photographing device 1 that photographs a prescribed range including the face of the driver; and a lighting control unit 522 that lights a lighting device 2 for emitting light which is attached to the photographing device 1 or around the photographing device 1 when the preliminary photography is performed by the preliminary photography unit 521. A control device 5 may be provided with an output unit 523 that outputs a message instructing the driver to look at the
(Continued)

lighting device when the preliminary photography is performed by the preliminary photography unit 521.

4 Claims, 3 Drawing Sheets

(56) References Cited

U.S. PATENT DOCUMENTS

| | | | | |
|---|---|---|---|---|
| 2013/0222642 | A1* | 8/2013 | Watanabe | H04N 23/611 |
| | | | | 348/234 |
| 2017/0166130 | A1* | 6/2017 | Foote | B60R 1/083 |

FOREIGN PATENT DOCUMENTS

| | | | |
|---|---|---|---|
| JP | H08-249454 A | | 9/1996 |
| JP | H09007099 A | | 1/1997 |
| JP | H11352987 A | | 12/1999 |
| JP | 2005242428 A | | 8/2005 |
| JP | 2006096316 A | | 4/2006 |
| JP | 2008037118 A | | 2/2008 |
| JP | 2009199417 A | | 3/2009 |
| JP | 2009199417 A | * | 9/2009 |
| JP | 2013-056633 A | | 3/2013 |
| JP | 3208154 U | | 12/2016 |
| JP | 2017-151693 A | | 8/2017 |

OTHER PUBLICATIONS

Written Opinion of the International Searching Authority dated Apr. 14, 2020, for International Application No. PCT/JP2020/005440, 5 pages.
The State Intellectual Property Office of People's Republic of China, The First Office Action, Application No. 202080016534.7, dated Sep. 30, 2022, in 16 pages.

* cited by examiner

CONTROL DEVICE AND PHOTOGRAPHING SYSTEM

CROSS-REFERENCE TO RELATED APPLICATIONS

This application is a U.S. National Stage entry of PCT Application No: PCT/JP2020/005440 filed Feb. 13, 2020, which claims priority to Japanese Patent Application No. 2019-031708 filed Feb. 25, 2019, the contents of which are incorporated herein by reference.

TECHNICAL FIELD

The present disclosure relates to a control device and a photographing system for performing photographing with a photographing device.

BACKGROUND ART

It is proposed to photograph a driver's face with a camera provided in a vehicle and detect driver's inattentive driving from a photographed image of the driver's face (see, for example, Patent Literature 1).

CITATION LIST

Patent Literature

Patent Literature 1: JP-A-2005-242428

SUMMARY OF INVENTION

Technical Problem

In order to detect inattentive driving, it is necessary to photograph a driver's face in advance with the driver facing a direction of the camera to acquire features of the driver's face. However, when the driver is photographed in advance, the driver may not be facing the direction of the camera, which causes a problem that the acquisition of the facial features of the driver fails.

In addition, a camera used for photographing for detecting inattentive driving is usually inspected at a vehicle manufacturing plant to see whether the camera is attached to the vehicle in a correct orientation before the vehicle is shipped. For the inspection, it is necessary for a worker to sit in a driver's seat in a state of facing the direction of the camera and to photograph a worker's face in advance with the camera. The inspection can fail because the worker is not facing the camera when photographing the face.

The present disclosure is made in view of these points and an object thereof is to provide a control device and a photographing system which allow a driver or the like to face a direction of a photographing device when photographing in advance.

Solution to Problem

A control device of a first aspect of the present disclosure includes a pre-photographing unit which performs pre-photographing which is photographing in a stage before main photographing to photograph a driving state of a driver by a photographing device which photographs a predetermined range including a driver's face of a vehicle and a lighting control unit which lights a lighting device for emitting light, which is attached to the photographing device or around the photographing device when the pre-photographing unit performs the pre-photographing. The control device may include an output unit which outputs a message instructing a driver to see the lighting device when the pre-photographing unit performs the pre-photographing.

The photographing system of a second aspect of the present disclosure includes a photographing device which is arranged diagonally in front of a driver's seat of a vehicle and photographs a predetermined range including a face of a driver of the vehicle, a lighting device for emitting light, which is attached to the photographing device or around the photographing device, a pre-photographing unit which performs pre-photographing which is photographing in a stage before main photographing to photograph a driving state of a driver by the photographing device, and a lighting control unit which lights the lighting device when the pre-photographing unit performs the pre-photographing.

The photographing device and the lighting device may be attached to a pillar on a driver's seat side. The lighting control unit may detect presence or absence of an obstacle existing in an area of a blind spot from a driver and light the lighting device when the obstacle is detected.

Advantageous Effects of Invention

According to the present disclosure, there is an effect that the driver or the like are allowed to face the direction of the photographing device when the driver or the like of the vehicle is photographed in advance.

DESCRIPTION OF EMBODIMENT

[Outline of Photographing System]

Figure 1:
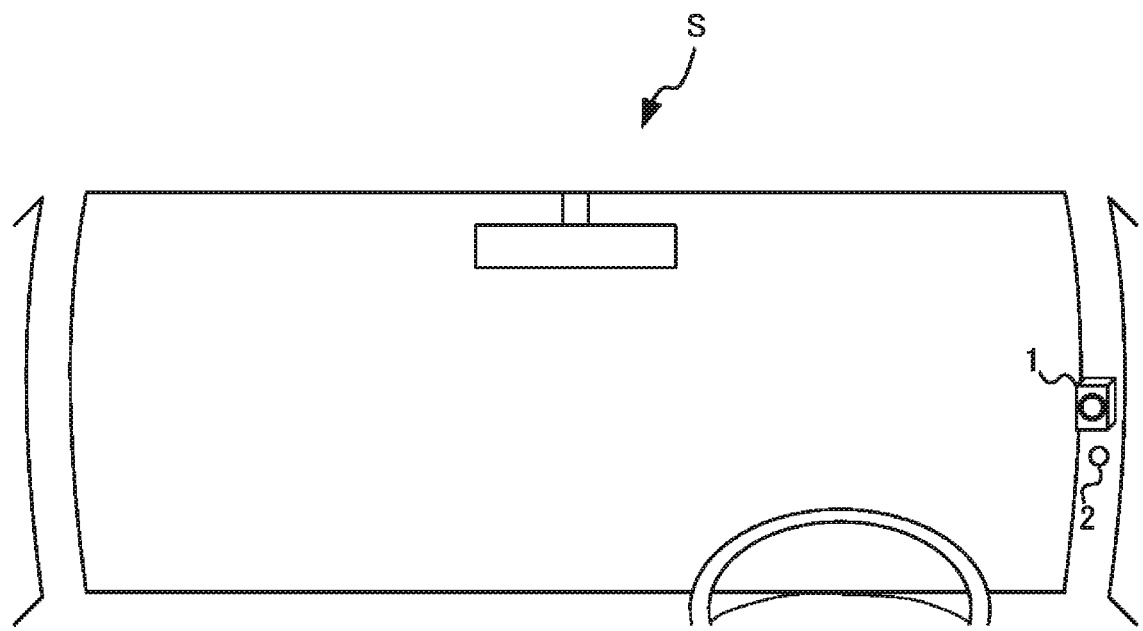
FIG. 1 is a view for illustrating an outline of a photographing system according to an embodiment.

FIG. 1 is a view for illustrating an outline of a photographing system S of the present embodiment. The photographing system S includes a photographing device 1 and a lighting device 2 mounted on a vehicle. The photographing device 1 is a camera for photographing a predetermined range including a face of a driver of the vehicle. The photographing device 1 is arranged diagonally in front of a driver's seat of the vehicle, but may be arranged in a front direction of the driver's seat. The predetermined range is predetermined by, for example, a designer or the like setting the orientation and angle of view of the photographing device 1 for photographing the face or upper body of an average driver. The photographing device 1 photographs a driver in order to detect a driving state such as inattentive driving of a driver in the photographing system S.

The photographing device 1 performs main photographing for photographing the driving state of a driver. In addition, the photographing device 1 performs the pre-photographing, which is photographing in a stage before the main photographing. The pre-photographing is performed, for example, in order to acquire feature information indicating facial features used for determining the orientation of the driver's face in detecting inattentive driving. Facial features are, for example, the contour of the face and the positional relationship of the eyes or nose.

The lighting device 2 is a light source which emits light. The lighting device 2 is attached around the photographing device 1. In an example of FIG. 1, the lighting device 2 is attached to a pillar on a driver's seat side of the vehicle together with the photographing device 1. Further, the lighting device 2 may be formed integrally with the photographing device 1.

The lighting device 2 lights up when the pre-photographing is performed by the photographing device 1. With such a configuration, the driver is guided to look at the lighting device 2 which is lit. Therefore, the photographing system S allows the driver to face the photographing device 1 in the pre-photographing. Since the photographing device 1 generates a photographed image of the driver's face in a state where the driver faces the direction of the photographing device 1, from the photographed image, it is possible to obtain a feature which serves as a reference for determining the orientation of the face.

[Configuration of Photographing System]

Figure 2:
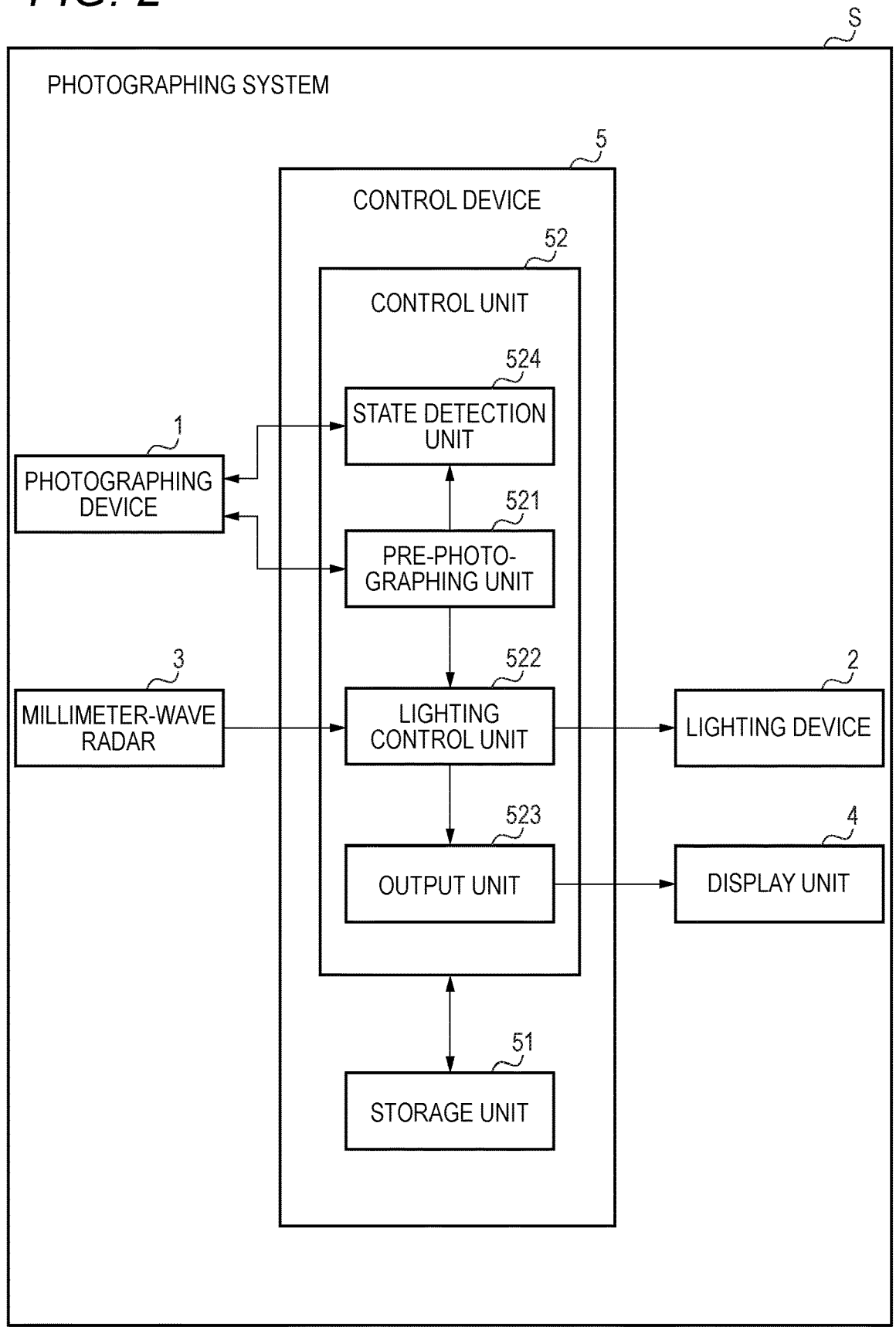
FIG. 2 is a diagram illustrating a configuration of the photographing system.

FIG. 2 is a diagram illustrating the configuration of the photographing system S. The photographing system S includes the photographing device 1, the lighting device 2, a millimeter-wave radar 3, a display unit 4, and a control device 5. The millimeter-wave radar 3 uses electromagnetic waves in a millimeter-wave band having a wavelength of about 1 cm or less to detect the presence or absence of an obstacle in lateral and rear areas of the vehicle, which are blind spots from the driver. The obstacle is, for example, a car and a pedestrian. The display unit 4 is a display for displaying a message.

The control device 5 includes a storage unit 51 and a control unit 52. The storage unit 51 is composed of, for example, a Read Only Memory (ROM), a Random Access Memory (RAM), or the like. The storage unit 51 stores various programs and various data for operating the control unit 52.

The control unit 52 is, for example, an Electronic Control Unit (ECU). The control unit 52 functions as a pre-photographing unit 521, a lighting control unit 522, an output unit 523, and a state detection unit 524 by executing various programs stored in the storage unit 51.

The pre-photographing unit 521 performs the pre-photographing, which is photographing in a stage before the main photographing, by the photographing device 1. For example, the pre-photographing unit 521 determines whether a turn-on operation of an ignition key is accepted, and when it is determined that the turn-on operation is accepted, the pre-photographing is performed. The pre-photographing unit 521 acquires feature information indicating facial features used for determining the orientation of the driver's face by analyzing the photographed image photographed by the pre-photographing. Further, the pre-photographing unit 521 may perform pre-photographing in order to inspect whether the photographing device 1 is attached to the vehicle in a correct orientation at a vehicle manufacturing factory. In the inspection, the pre-photographing unit 521 photographs a worker sitting in the driver's seat of the vehicle instead of a driver.

The lighting control unit 522 lights the lighting device 2 when the pre-photographing unit 521 performs the pre-photographing. For example, the lighting control unit 522 blinks the lighting device 2 immediately before the pre-photographing. The lighting control unit 522 can guide the driver to face the direction of the photographing device 1 by lighting the lighting device 2 in the pre-photographing. On the other hand, the pre-photographing unit 521 does not light the lighting device 2 in the main photographing by the photographing device 1.

The lighting control unit 522 detects the presence or absence of an obstacle existing in an area of a blind spot from the driver based on a detection result of the millimeter-wave radar 3. When the lighting control unit 522 determines that an obstacle existing in the area of the blind spot from the driver is detected, the lighting control unit 522 lights the lighting device 2 to warn the driver that the obstacle is detected.

The output unit 523 outputs a message instructing the driver to look at the lighting device 2 when the pre-photographing is performed by the pre-photographing unit 521. For example, the output unit 523 outputs the message to the display unit 4 at the same time as the lighting device 2 is lit. Further, the output unit 523 may output a voice including the message by a speaker (not illustrated).

After the pre-photographing unit 521 acquires the feature information, the state detection unit 524 performs the main photographing by the photographing device 1 at predetermined time intervals. The predetermined interval is, for example, 0.1 seconds. The state detection unit 524 detects a driving state such as driver's inattentive driving based on a photographed image generated from the main photographing.

More specifically, the state detection unit 524 specifies the orientation of the driver's face in the photographed image generated by the main photographing by using the feature information acquired by the pre-photographing unit 521. The state detection unit 524 determines that driver's inattentive driving is detected when an angle formed by the specified face direction and a traveling direction of the vehicle is equal to or greater than a permissible value. The permissible value is, for example, 45°.

[Photographing Process Procedure]

Figure 3:
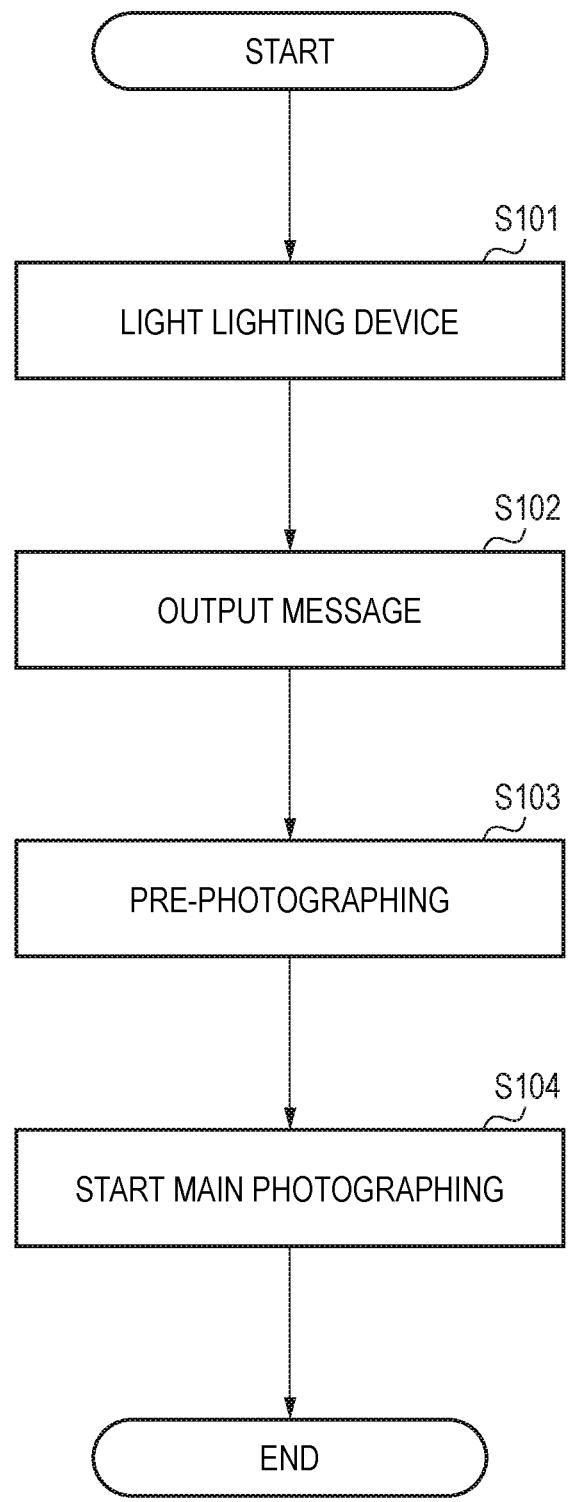
FIG. 3 is a flowchart illustrating a photographing process procedure by the photographing system.

FIG. 3 is a flowchart illustrating a photographing process procedure by the photographing system S. The process procedure starts, for example, when the pre-photographing unit 521 detects that the turn-on operation of the ignition key is accepted.

First, the lighting control unit 522 lights the lighting device 2 immediately before the pre-photographing (S101). At the same time as the lighting device 2 is lit, the output unit 523 outputs a message instructing the driver to see the lighting device 2 to the display unit 4 (S102). The pre-photographing unit 521 performs the pre-photographing with the photographing device 1 (S103). The state detection unit 524 starts the main photographing by the photographing device 1 (S104) and ends the process.

Normally, the driver visually recognizes the traveling direction in a state of driving the vehicle. Therefore, when a photographing device is attached near a steering wheel, the photographing device can photograph the driver from the front. However, in such a vehicle, since it is necessary to secure a space for the photographing device near the steering wheel, there is a problem that layout restrictions are increased in the design of an instrumental panel.

On the other hand, according to the present embodiment, the lighting control unit 522 lights the lighting device 2 when the pre-photographing unit 521 performs the pre-photographing. Therefore, the pre-photographing unit 521 can guide the driver to face the direction of the photographing device 1 and then perform the pre-photographing. Since the pre-photographing unit 521 generates a photographed image of the driver's face in a state where the orientation of the driver's face is known in the pre-photographing, from the photographed image, it is possible to acquire feature information which serves as a reference for determining the orientation of the driver's face. In addition, the pre-photographing unit 521 can suppress layout restrictions in the design of the instrumental panel.

When inspecting whether the photographing device 1 is attached to the vehicle in the correct orientation at the vehicle manufacturing plant, the pre-photographing unit 521 generates a photographed image of the face of a worker sitting in the driver's seat instead of a driver in the pre-photographing. The pre-photographing unit 521 determines that the photographing device 1 is attached to the vehicle in the correct orientation when a position of the worker's face is near a center of the photographed image. In the present embodiment, since the pre-photographing unit 521 guides the worker to face the direction of the photographing device 1 and then performs the pre-photographing, the position of the worker's face can be accurately specified in the photographed image. Therefore, the pre-photographing unit 521 can improve the accuracy of determining whether the photographing device 1 is correctly attached.

Although the present disclosure is described above using the embodiment, the technical scope of the present disclosure is not limited to the scope described in the embodiment described above and various modifications and changes can be made within the scope of the gist thereof. For example, all or a part of the device can be functionally or physically distributed and integrated in any unit. Also, new embodiments resulting from any combination of a plurality of embodiments are included in the embodiments of the present disclosure. The effect of the new embodiment produced by the combination has the effect of the original embodiment together.

This application is based on a Japanese patent application (Japanese Patent Application No. 2019-031708) filed on Feb. 25, 2019, the contents of which are incorporated herein by reference.

INDUSTRIAL APPLICABILITY

The photographing device 1 according to the present disclosure allows the driver or the like to face the direction of the photographing device when the driver or the like of the vehicle is photographed in advance.

REFERENCE SIGNS LIST

1: photographing device
2: lighting device
3: millimeter-wave radar
4: display unit
5: control device
51: storage unit
52: control unit
521: pre-photographing unit
522: lighting control unit
523: output unit
524: state detection unit
S: photographing system

The invention claimed is:

1. A control device, comprising:
   a pre-photographing unit which performs pre-photographing which is photographing in a stage before main photographing to photograph a driving state of a driver by a photographing device which photographs a predetermined range including a face of a driver face of a vehicle;
   a lighting control unit which lights a lighting device for emitting light, which is attached to the photographing device or around the photographing device when the pre-photographing unit performs the pre-photographing; and
   an output unit which outputs a message instructing the driver to see the lighting device before the pre-photographing unit performs the pre-photographing.

2. A photographing system, comprising:
   a photographing device which is arranged diagonally in front of a driver's seat of a vehicle and photographs a predetermined range including a face of a driver of the vehicle;
   a lighting device for emitting light, which is attached to the photographing device or around the photographing device;
   a pre-photographing unit which performs pre-photographing which is photographing in a stage before main photographing to photograph a driving state of a driver by the photographing device;
   a lighting control unit which lights the lighting device when the pre-photographing unit performs the pre-photographing; and
   an output unit which outputs a message instructing the driver to see the lighting device before the pre-photographing unit performs the pre-photographing.

3. The photographing system according to claim 2, wherein the photographing device and the lighting device are attached to a pillar on a driver's seat side.

4. The photographing system according to claim 2, wherein the lighting control unit detects presence or absence of an obstacle existing in an area of a blind spot from a driver and lights the lighting device when the obstacle is detected.

* * * * *